Feb. 19, 1929.
R. LA FRANCE
1,702,262
METHOD OF AND APPARATUS FOR FORMING GLASSWARE
Filed Sept. 2, 1926  5 Sheets-Sheet 5
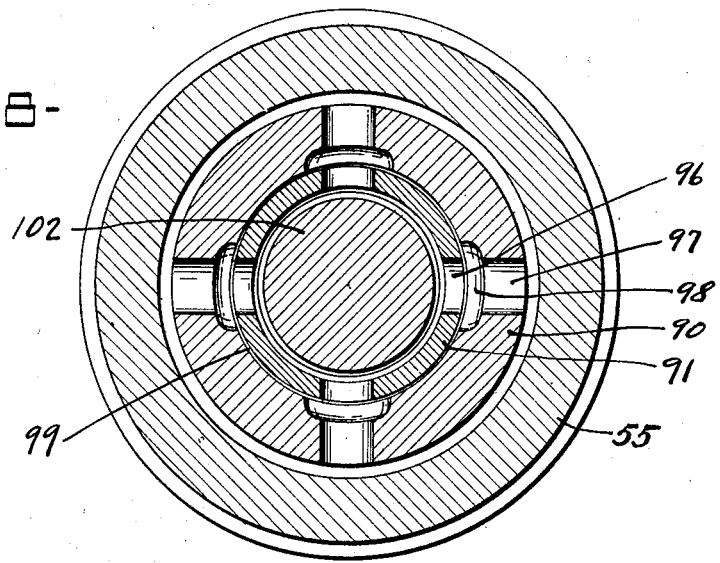
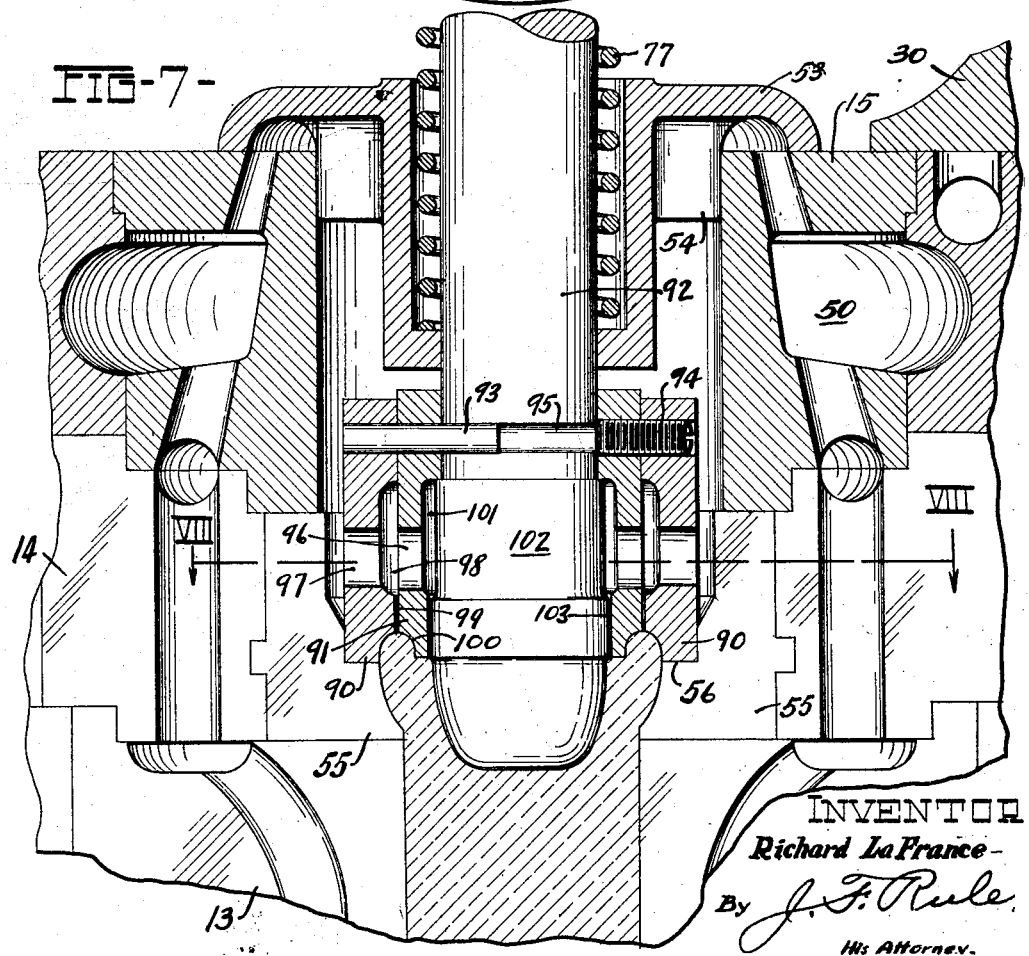
INVENTOR
Richard La France
By J. F. Rule
His Attorney Patented Feb. 19, 1929.

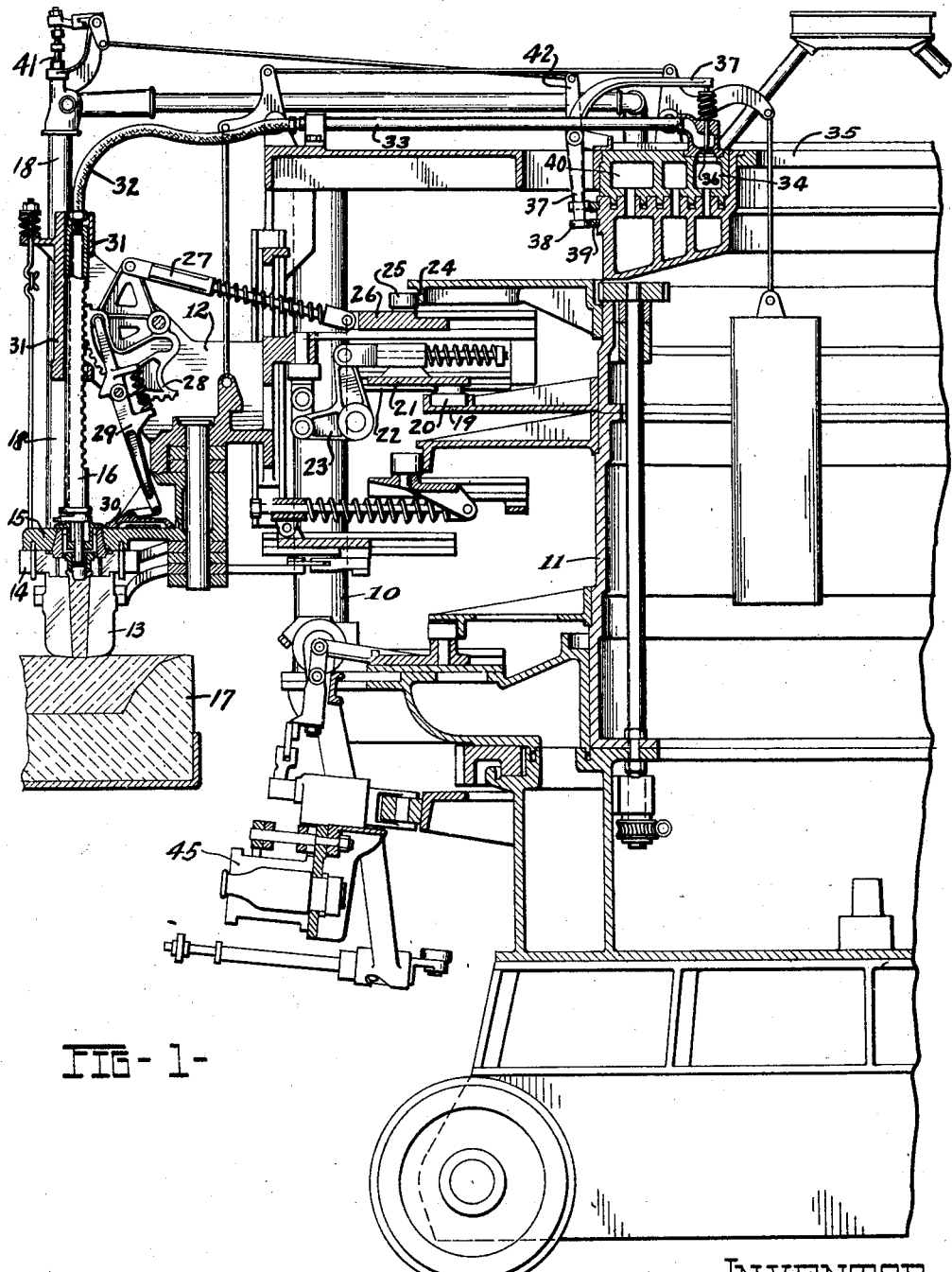
FIG-1-
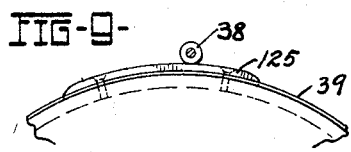
FIG-2-

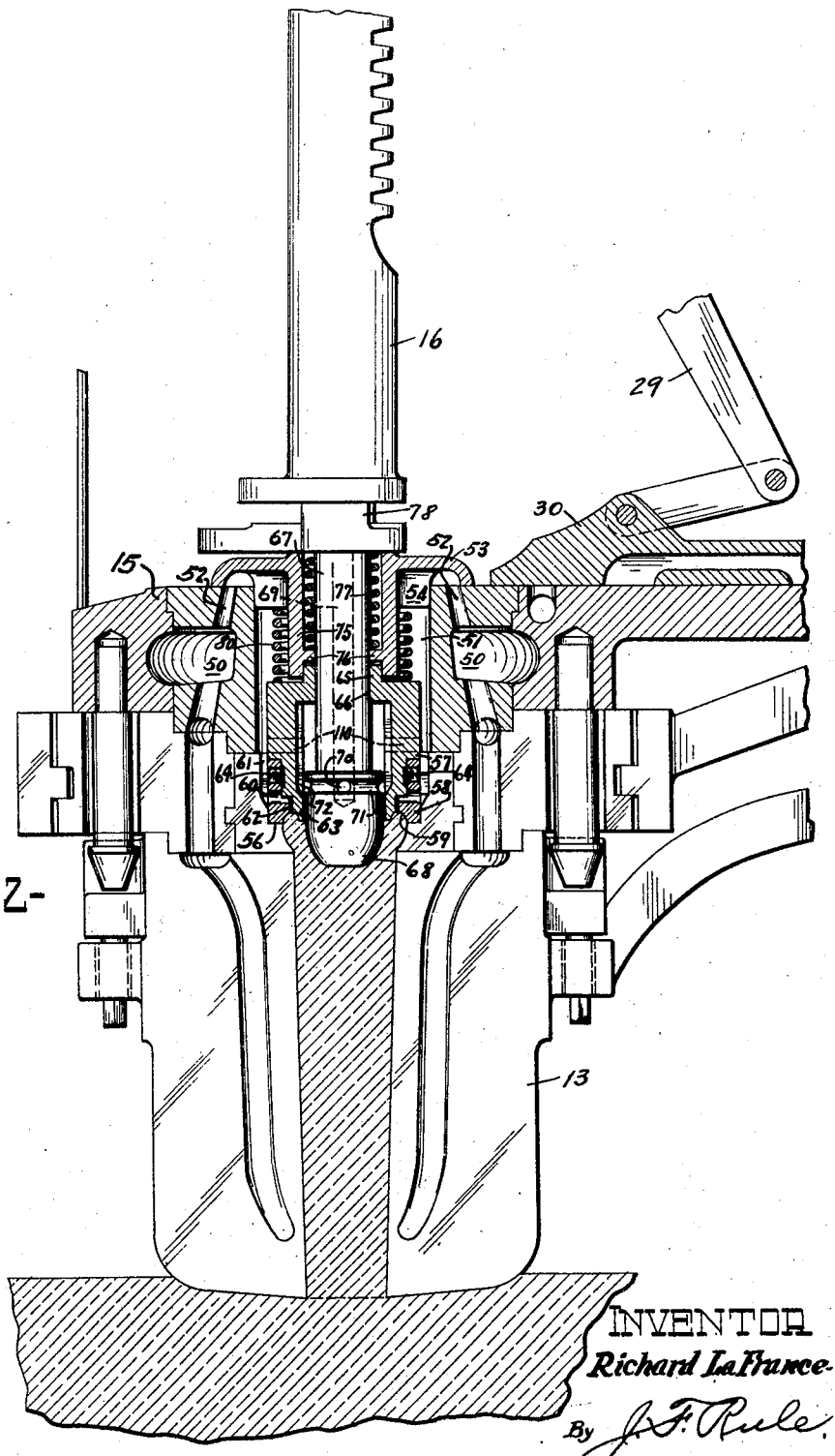

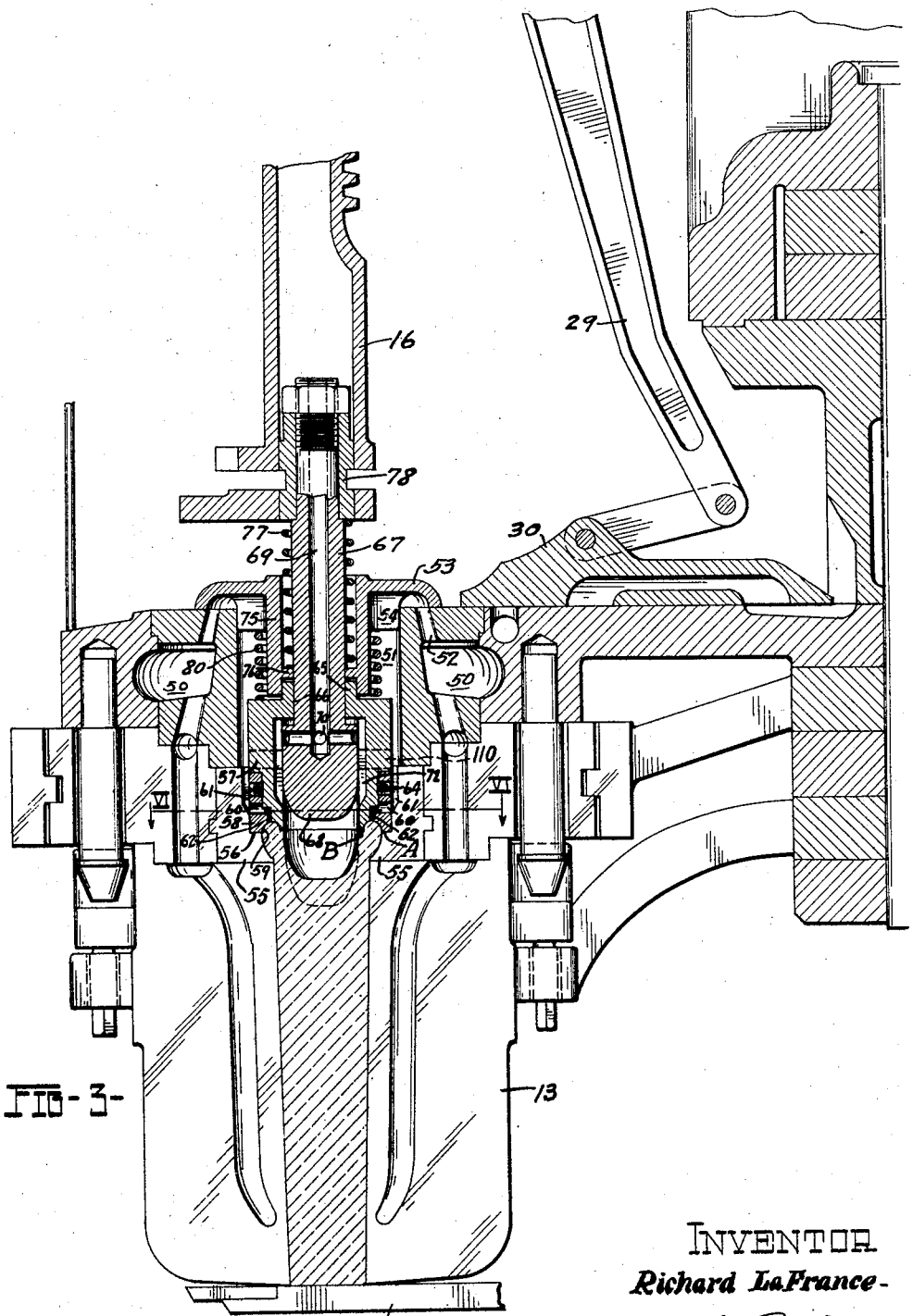

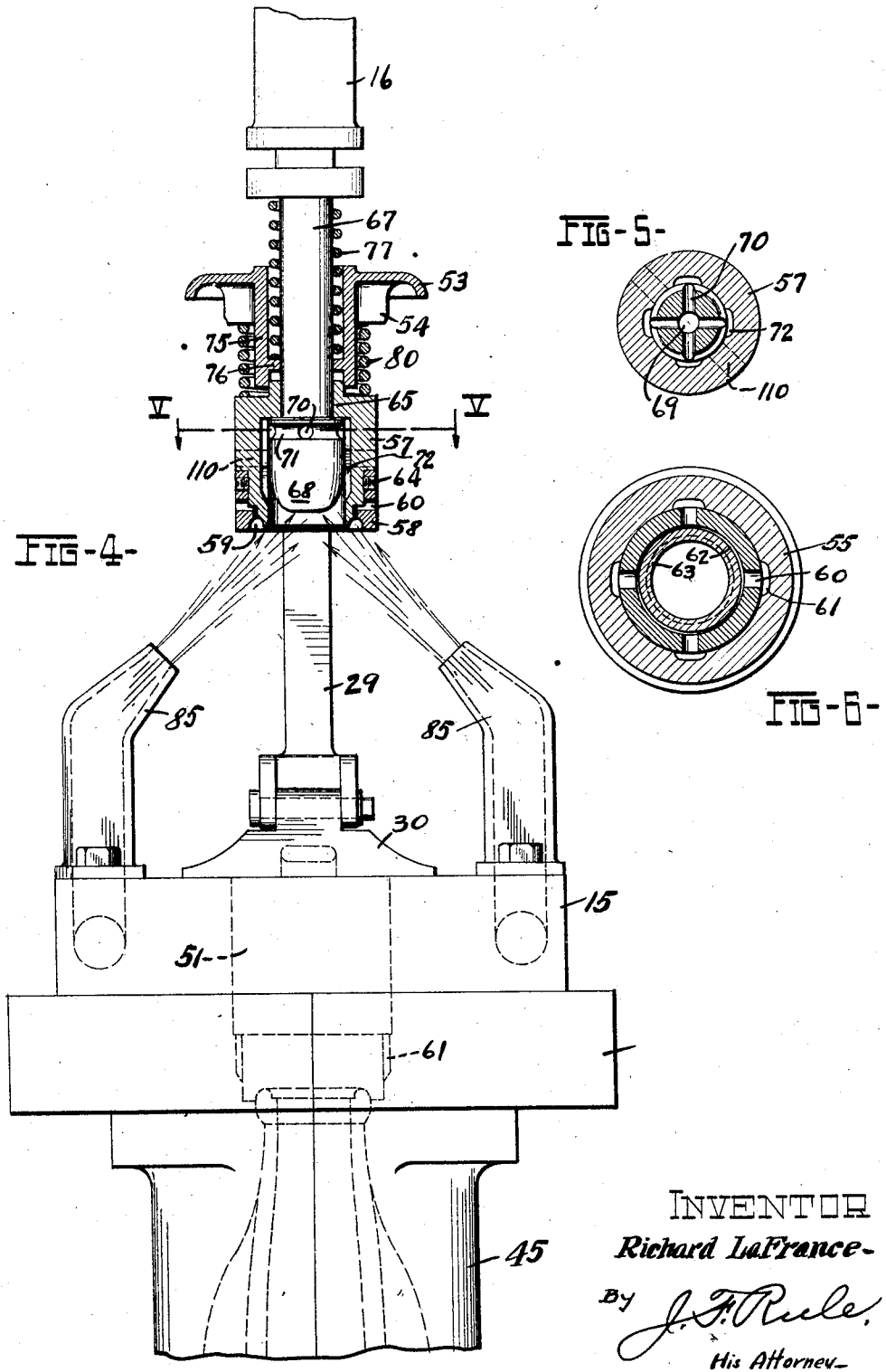

1,702,262

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

METHOD OF AND APPARATUS FOR FORMING GLASSWARE.

Application filed September 2, 1926. Serial No. 133,134.

This invention relates to improvements in methods of and apparatus for the manufacture of bottles and other similar blown glassware.

At the present time, the rate of production of quality ware on suction type machines is limited by the slow setting of the glass forming the lip or finish of the ware during the formation of the parison. This is particularly true in the production of bottles and similar ware having relatively heavy finish or lip portions. It is the usual practice in forming the parisons from which the ware is produced to draw the charge of molten glass into the blank and neck mold cavities, the latter cavity and a plunger tip coacting to give proper form to the finish. Ordinarily, the next step is to cut off the vacuum which has been drawing the glass upwardly in the blank and neck mold cavities, entirely remove the plunger tip from the neck mold and blowing head, and position the blow slide over the blowing head for supplying air pressure to compress the charge in the blank mold. Following this operation, the blank mold sections are moved out of engagement with the parison, and the finish mold sections are positioned to enclose said parison. The final blow then takes place in the usual well known manner.

An objection to the above method of forming parisons, particularly in the manufacture of heavy ware, is that the period of application of vacuum or suction during the initial period of the blank formation is insufficient to absolutely insure compelte filling of the neck mold and finish cavity with the molten glass. Partial filling of the cavity is reflected in the production of a finish of irregular surface formation, which quite frequently is of such serious nature that the ware must be discarded.

Another fault resulting from the short period of application of suction is that the finish is not properly set prior to cutting off of the vacuum and application of compressed air for compacting the charge. This condition means that the compressed air is applied to the charge while the finish is too soft and causes distortion of the latter to such a degree that defective ware is produced. Quite frequently, the glass in the neck mold is in such condition at the time air pressure is applied that this portion of the glass will actually stretch or flow under influence of the air passing thereover in compacting the charge and cause the distortion above referred to.

An object of the present invention is to provide means for lengthening the period of application of suction to the mold charge to insure complete filling of the neck and finish cavity and thereby eliminate the formation of a distorted finish, and at the same time materially increase production.

Another object is to provide means whereby the time ordinarily consumed in substituting the blow slide for the plunger and plunger cap is utilized in lengthening the period of application of suction to the charge.

A further object is to provide means whereby compressed air is initially applied to the charge for compacting the latter in the blank mold substantially simultaneously with relatively slight elevation of the plunger tip, thereby more closely associating the periods of application of vacuum and compressed air, than heretofore. Elimination of the necessity for using the blow slide in the application of compressed air in compacting the glass in the blank mold, materially speeds up production.

A still further object is to provide means for protecting the finish during the application of air pressure for compacting the glass, said means preventing such contact of air pressure with the molten glass in the finish as would cause stretching or flowing of the molten glass and consequent distortion.

Other objects will be apparent hereinafter.

In the accompanying drawings:

Fig. 1 is a fragmentary sectional elevation of a glass blowing machine to which the present invention is applied.

Fig. 2 is a view of a blank mold and associated parts and illustrates the relation of the several parts during the gathering of a charge into the blank mold.

Fig. 3 is a view similar to Fig. 2 but shows the parts positioned for application of air pressure in compacting the charge in the mold.

Fig. 4 shows the plunger and plunger sleeve elevated above the blow head.

Fig. 5 is a sectional view taken substantially on the line V—V of Fig. 4.

Fig. 6 is a sectional view taken substantially on the line VI—VI of Fig. 3.

Fig. 7 illustrates in sectional elevation another application of the principle involved.

Fig. 8 is a sectional view taken on line VIII—VIII of Fig. 7.

Fig. 9 is a fragmentary plan view showing the cam arrangement for causing cooling air to flow through the plunger tip.

The invention is herein shown in connection with an automatic machine of the well known Owens type in which the blank molds carried on a continuously rotating carriage are successively brought into contact with a pool of molten glass and are charged by suction.

The mold carriage 10 is adapted to be continuously rotated about a stationary column 11 by any preferred means. Supported on the mold carriage are a plurality of dipping heads or frames 12, each carrying a blank mold 13, a neck mold 14, a blowing head 15, a vertically sliding plunger stem 16, and suitable mechanism for operating said parts. With continuous rotation of the mold carriage, the blank molds 13 are successively brought over a supply tank 17 containing molten glass. Upon reaching a position over the supply tank, the head 12 is lowered to bring the blank mold into contact with the molten glass. Suction is then applied through the vacuum pipe 18, blowing head 15 and neck mold 14 to draw a charge of glass into the blank mold.

The lifting and lowering of the head 12 is controlled by a stationary cam 19 on which runs a cam roll 20, carried by a slide block 21. This slide block is movable radially of the machine in guides 22, and is connected through a bell crank 23 to the frame or head 12. The up and down movements of the plunger are effected by means of a cam 24 on which runs a roll 25 carried by a slide block 26, connected through a link 27 to a gear segment 28 which runs in mesh with rack teeth formed on the plunger stem 16. This segment operates to lift the plunger stem 16 and by means of a cam actuates a lever 29 to radially shift a blow slide 30 in the usual manner.

The plunger stem 16 is of hollow formation, is slidable through a fixed guide 31 and has separable connection at its upper end with a flexible hose coupling 32. This coupling 32 provides connection between the plunger stem and a fixed pipe line 33 whose inner end is fixed to an air pressure chamber 34 in a distributing head 35. Air pressure is admitted to the pipe line 33 from said air pressure chamber 34 by the periodic opening of a control valve 36 which is actuated by a bell crank 37 whose lower end carries a roll 38 running upon a stationary cam 39. This cam 39 is provided with an offset portion (not shown) which causes movement of the bell crank and actuation of the control valve at proper intervals.

In charging the blank mold, a vacuum or partial vacuum is created in the blank and neck molds by suction through the blow head 15, and the vacuum pipe 18, said pipe being connected to the vacuum chamber 40 of the distributing head 35. The vacuum pipe is provided with a control valve 41 which is periodically operated by a lever 42 which is rocked by means of a cam in the usual manner.

A finished mold 45 is associated with each unit and is periodically brought into operative engagement with a formed parison and the neck mold by means of the usual or any preferred form of cam mechanism and the ware blown therein to the desired final shape.

The blowing head 15 is formed with the usual vacuum chamber 50 and with a vertical central bore 51, the latter communicating with said vacuum chamber by way of ports 52 opening through the upper end of the blowing head. These ports and the central bore 51 are covered by means of a plunger cap 53 having radial ribs 54 which extend into the bore and accurately center said cap. The plunger cap 53 is of such internal formation that communication is provided between the ports 52 and the central bore 51 at the upper end of the head.

The neck mold 14, which is associated with the blowing head during the parison formation is equipped with a neck mold thimble 55 having a central bore which registers with the bore of the blowing head. The wall of the bore through the neck mold thimble is provided with an annular shoulder 56 near its lower end and from this shoulder to said lower end, the wall is shaped in accordance with the requirements of the ware being produced. A plunger tip sleeve 57 and bottom ring 58 are separably interconnected, the bottom ring resting upon the aforementioned annular shoulder 56. The sleeve and ring are telescoped one within the other with their lower ends substantially co-extensive and shaped to give the desired form to the finish of ware being blown. The lower adjacent ends of the sleeve and ring are spaced apart slightly, providing an annular air passageway 62, and are also formed with an annular channel 59 by way of the ports and central bore in the blowing head, the radial ports 60 in said bottom ring, and said annular passageway 62. These last named ports 60 open at their outer ends into longitudinal channels 61 formed in the wall of the neck mold thimble above said shoulder 56 as shown in Fig. 3. The inner ends of these radial ports 60 open into the annular passageway 62 created between said bottom ring 58 and plunger tip sleeve 57. Thus, it is seen that creation of a vacuum in the chamber 50 and bore 51 will withdraw a portion of the air from the mold cavities through the annular space 62 and cause movement of the molten glass into said channel 59 to form the bottle finish.

The plunger tip sleeve 57 is provided with a number of radial openings 110 forming communication between its interior and the central bore 51 of the blowing head. Because of the arrangement of the radial openings, air under pressure serves to chill the plunger tip sleeve in addition to compressing the charge. Provision of these openings and a loose connection between the bottom ring 58 and the neck mold thimble permits withdrawal of air from the molds and finish cavity at the points "A" and "B," as well as through the aforementioned annular passageway 62 in the bottom of the annular channel 59. This construction insures complete filling of the finish forming space or cavity. In forming the lower end of the plunger tip sleeve 57, the inner portion 63 is shaped to create the usual sealing surface at the finish end of the bottle. Connection between the plunger tip sleeve and said bottom ring is effected by readily removable screws 64, thereby providing for replacement of either member as required.

The upper end of the plunger tip sleeve 57 is provided with a central opening 66 whose wall is lengthened to provide a bearing 65 for the elongated shank 67 which carries the plunger tip 68. The plunger tip 68 is of greater diameter than the shank 67 providing an annular shoulder, and is slidable in the plunger tip sleeve 57, being adapted at times to project below the lower ends of the sleeve and bottom ring which form the bottle finish. The shank 67 is formed with an axial passageway 69 terminating in the plunger tip and having communication with a plurality of radial ports 70. These ports open into an annular channel 71, formed in the outer face of the plunger tip 68, thereby forming a continuous channel for the passage of air pressure from the plunger stem 16 to the interior of the plunger tip sleeve, and thence to the upper end of the parison by way of a plurality of longitudinal channels 72 to the upper end of the parison being formed. Admission of air pressure into contact with the parison is permitted only after the plunger tip has been elevated to substantially the position shown in Fig. 3.

The plunger cap 53 is formed with a central depending sleeve 75, through which the plunger carrying shank 67 slides. This sleeve 75 has an inwardly extending annular rib 76 near its lower end to space the shank 67 from the inner wall of the sleeve and provide an annular chamber in which a coil expansion spring 77 is arranged. This rib also supports one end of the expansion spring, the other end of the latter being engaged with the lower end of a sleeve 78 carried by the upper end of the shank 67 and engaged with the sliding plunger stem 16. The plunger tip 68 is normally elevated to its uppermost position by means of the spring 77. The aforementioned cam 24 and gear segment 28 are employed to lower the plunger tip into an operative position at the proper intervals and against the tension of said spring 77. For holding said plunger tip sleeve and bottom ring in a position to coact with the neck mold thimble in forming the finish of a bottle, a coil expansion spring 80 surrounds the sleeve 75 depending from the plunger cap 53 and has one end bearing upon the upper end of said plunger tip sleeve 57 while its other end engages the radial ribs 54 which depend from said plunger cap. Thus, it is seen that expansion of this spring effectively holds the bottom ring 58 in contact with the annular shoulder 56 formed upon the inner wall of the neck mold thimble, though not to such a degree that passage of air is prevented when vacuum is to be created in the molds.

In operation, the blank mold is first brought to a position above a supply body of molten glass and the dipping head 12 is lowered to bring the open end of the blank mold into contact with said glass. At this point, the valve 41 is opened under influence of the usual stationary cam which acts upon the valve control lever 42. Opening of this valve tends to create a vacuum in the blowing head, neck mold and blank mold cavity, causing a charge of glass to be drawn into the blank and neck mold cavities. According to the structure herein disclosed, air is withdrawn from the finish cavity at three spaced points, namely, the annular space between the lower ends of the plunger tip sleeve and bottom ring, the space between the lower end of said bottom ring and the annular shoulder 56 of the neck mold thimble, and at the point of engagement of the finish with the lower side portion of the plunger tip sleeve 57. Such creation of vacuum assures complete filling of the neck mold cavity and a fully formed finish.

Projection of the plunger tip 68 through the neck mold thimble and slightly into the blank mold cavity, forms the usual initial blow opening which, as indicated by broken lines in Fig. 3 is later somewhat enlarged when air pressure is applied thereto, such enlargement being due to shrinkage of the glass resulting from contact with the mold in the plunger tip and adjacent metal portions of the mold. The plunger tip is in its lowered position at the time the blank mold is elevated out of contact with the supply body of glass and after the cut-off knife 81 has operated and come to rest under the mold. Vacuum in the molds is continued for a relatively great length of time after the cut-off has operated to further assure complete full formation of the bottle finish and proper setting of the glass forming said finish, before air pressure is admitted to compress the blank. At a predetermined station, the vacuum is cut-off and the plunger tip 68 is raised substantially to the upper end of the plunger tip sleeve 57 (see Fig. 3) by means of an extra offset in the stationary cam 24.

After the plunger tip 68 has been elevated to a point near the upper end of the plunger tip sleeve 57, the stationary cam 39 moves the bell crank 37, causing movement of the compressed air control valve 36. Operation of this valve admits compressed air through the sliding plunger stem 16, said shank 67, and the radial openings in the plunger tip 68. The air then passes through longitudinal openings 72 in the inner wall of the plunger tip sleeves 57 and then into contact with the glass in the blank mold, causing compression of said glass. In machines heretofore used, compression of the blank necessitates complete removal of the plunger tip from the blow head and movement of the blow slide 30 to a position over said blowing head. Elimination of the necessity for use of the blow slide in compressing or blowing the blank, and substitution therefor of the quick retraction of the plunger tip and almost simultaneous application of compressed air around the plunger tip to the blank, allows a considerably longer chilling period by suction than has been possible heretofore. In other words, the time heretofore employed in lifting the plunger tip, and then by a separate operation, moving the blow slide laterally, is now added to the period of creation of vacuum, thereby insuring a more perfect and complete setting of the finish. This increase in the period of creation of vacuum also retains the finish in contact with the bottom ring and plunger tip sleeve, causing added chilling and consequently more effective setting of said finish than has been heretofore possible.

After a given period of application of compressed air to the blank being formed, the air is cut off and the knife is swung out of engagement with the blank mold and parison by any conventional means. The stationary cam 24 then acts to move the gear segment 28 and cause lifting of the plunger stem 16 to the Fig. 4 position in which the plunger tip 68 and sleeve entirely clear the path of the blowing head. In this position, cooling air may be directed to the plunger tip and associated parts from suitable nozzles 85. Raising of the plunger tip and associated parts to the position shown in Fig. 4 permits lowering of the plunger tip sleeve 57 and the bottom ring 58 to a point at which the annular shoulder at the upper end of said tip engages the upper inner end of the sleeve and supports the latter. This spacing apart of the tip and sleeve allows a more complete application of cooling air to the surface of said tip.

As is customary, lifting of the plunger tip automatically moves the blow slide 30 radially outward to a position over the blowing head. The blank mold sections are then moved away from the parison, leaving the latter suspended from the neck mold in the usual manner. The finish mold sections are then elevated and brought together to enclose the suspended parison. The final blowing of the blank to the form of the finished ware is accomplished by application of air pressure through the blowing head 15 in the usual or any preferred manner.

In the form shown in Figs. 7 and 8, the neck mold 14 and blow head 15 are of the same construction as those in the preceding figures. The neck mold thimble 55 is provided with a central passageway whose wall is formed with an annular radial shoulder 56 upon which rests an external plunger tip sleeve 90. This sleeve 90 encloses an inner sleeve 91. The two sleeves are connected with each other and to the plunger shank 92 by means of a connecting pin 93 and a screw 94, the latter extending radially through the two sleeves and abutting the outer end of the annular wall of a transverse opening 95 extending through said shank.

These inner and outer plunger tip sleeves 91 and 90 are provided with a series of registering radial ports 96 and 97, respectively. Each outer port 97 opens at its inner end directly into a vertical elongated chamber 98 which is cored out of the inner wall of the outer sleeve 90, each of said chambers in turn communicating with an annular space 99 provided between said sleeves and permitting withdrawal of air from the annular finish cavity channel 100 which is formed in the adjacent lower ends of said sleeves. This channel 100 may be of any preferred cross sectional shape as required by the particular ware being produced. Radially inward from the finish forming channel 100, the lower end of the inner sleeve 91 is shaped to form the sealing surface of the bottle or other ware being produced.

The inner plunger tip sleeve 91 has its inner wall cored to form an annular passageway 101 which extends entirely around the plunger 102, thereby permitting uniform withdrawal of air from the blank and neck mold cavities through the space 103 between the lower end of said sleeve 91 and the plunger 102. The connection between the outer sleeve 90 and the annular radial shoulder 56 on the neck mold thimble 55 is of such form that a certain amount of air is drawn therethrough from the neck mold cavity during charging of the molds and setting of the finish. Thus, it is seen that the suction will draw the molten glass into the finish portion of the neck mold cavity in three different directions, thereby insuring complete filling of said cavity.

Due to the positive connection between the plunger shank 92 and the plunger tip sleeves 90 to 91, and consequent positive movement of these elements as a unit, the plunger cap 53 is spaced from said sleeves and merely slides upon the plunger shank 92. As in the preceding form, a coil spring 77 is associated with the plunger cap 53 for the purpose of effectively engaging the latter with the blowing head 15.

Cooling of the plunger tip 68 may be effected by providing an offset or jog 125 on the stationary cam 39. This offset is so located that upon withdrawal of the plunger tip and surrounding sleeve, the bell crank 37 is rocked by the offset, causing opening of the valve 36 and consequent flow of cooling air to and through the plunger tip 68.

Manifestly, changes may be resorted to such as fall within the scope of the appended claims.

What I claim is:

1. In a glass forming apparatus, the combination of a blank mold, a neck mold in register therewith, a plunger adapted for projection into said molds and having air pressure supply passageways opening through the sides of said plunger, a plunger tip sleeve surrounding said plunger and having its lower end shaped to form a finish cavity, means for drawing a charge into the blank and neck molds and said finish cavity, and means for retracting said plunger independently of the sleeve, and simultaneously supplying air pressure through said passageways to compact the glass in said molds.

2. In glass forming apparatus, the combination of a blank mold, a neck mold in register therewith, a plunger movable into said molds, a sleeve surrounding said plunger and having a limited sliding movement thereon, a bottom ring fixed around the lower portion of said sleeve, said sleeve and ring having their lower ends shaped to form a finish cavity, means for charging said molds and filling said cavity, means for retracting said plunger, and means for supplying air pressure through the neck mold around the plunger substantially simultaneously with retraction of said plunger.

3. In a glass forming apparatus, the combination of the blank mold, a neck mold, a neck mold thimble having an annular radial shoulder on its inner wall, a pair of telescopically arranged sleeves, one of which rests upon said shoulder at times, said sleeves having an annular downwardly opening channel at their lower ends forming a finish cavity, a plunger movable within said sleeves, means for withdrawing air from the molds and finish cavity, and means for introducing compressed air into the upper end of the blank mold from between said plunger and the adjacent sleeve.

4. In a glass forming apparatus, a neck mold, a neck mold thimble having an annular radial shoulder on its cavity wall, a pair of telescopically arranged sleeves, one of which rests upon said shoulder at times, said sleeves having their lower ends formed with an annular finish cavity, and means permitting withdrawal of air from the finish cavity at a plurality of spaced points.

5. In a glass forming appartus, a neck mold, a neck mold thimble having an annular radial shoulder on its cavity wall, a pair of telescopically arranged sleeves, one of which rests upon said shoulder at times, said sleeves having their lower ends formed with an annular finish cavity, means permitting withdrawal of air from the finish cavity at a plurality of spaced points, and a plunger movable in the inner sleeve and adapted to be projected beyond the finish cavity to coact with the latter in forming a parison neck portion.

6. In a glass forming apparatus, a neck mold, a neck mold thimble having an annular radial shoulder on its cavity wall, a pair of telescopically arranged sleeves, one of which rests upon said shoulder at times, said sleeves having their lower ends formed with an annular finish cavity, means permitting withdrawal of air from the finish cavity at a plurality of spaced points, a plunger movable in the inner sleeve and adapted to be projected beyond the finish cavity to coact with the latter in forming a parison neck portion, means for moving the plunger upwardly into the inner sleeve, and cam actuated means for supplying air pressure through the lower end of said inner sleeve.

7. In a glass forming apparatus, a neck mold, a neck mold thimble having an annular radial shoulder on its cavity wall, a pair of telescopically arranged sleeves, one of which rests upon said shoulder at times, said sleeves having their lower ends formed with an annular finish cavity, means permitting withdrawal of air from the finish cavity at a plurality of spaced points, a plunger movable within the inner sleeve and adapted to be projected beyond the finish cavity to coact with the latter in forming a parison neck portion, the inner wall of the inner sleeve having a series of longitudinal channels, means for moving the plunger entirely into said sleeve, and means for supplying air through said channels and the lower end of said sleeve.

8. In a glass forming apparatus, the combination of a blank mold, a neck mold in register therewith, a plunger, a pair of telescopically arranged sleeves surrounding said plunger, the outer sleeve having radial openings, said sleeves having their lower ends shaped to form an annular finish cavity, said sleeves being spaced apart at their lower ends providing communication between said cavity and the radial openings, means for withdrawing air from the finish cavity through the space between the sleeves and through said radial openings, means for moving the plunger into the inner sleeve, and cam actuated means for supplying air pressure from around the plunger into contact with the glass to give the parison its final form.

9. In a glass forming apparatus, the combination of blank mold, a neck mold in register therewith, a plunger movable into and out of the neck mold, a finish shaping member surrounding the plunger, and having a finish forming cavity in its lower end, and means for withdrawing air from said cavity at radially spaced points of the cavity wall to charge the molds.

10. In a glass forming apparatus, a neck mold thimble having a central bore and formed with an annular radial shoulder on the wall of said bore, a finish shaping member resting upon said shoulder and having an annular channel in its lower end coacting with a portion of said wall to form a neck and finish cavity, a plunger arranged within said shaping member and having an axial opening communicating with radial ports adjacent the tip, means for projecting a portion of the plunger beyond said shaping member into the neck mold cavity, means for retracting said plunger to a position entirely within the shaping member, and means for applying air pressure through said radial opening and the shaping member to the glass in the neck mold substantially simultaneously with the retraction of said plunger.

11. In a glass forming apparatus, a blank mold, a neck mold in register therewith, a plunger movable into and out of the neck mold, a finish shaping member surrounding the plunger and having a finish forming cavity at its lower end, means for exhausting air from the blank and neck mold cavities at radially spaced points in the finish cavity, means for moving the plunger entirely within said finish shaping member, and means including passageways in the plunger and channels in the shaping member for directing air pressure to said cavities from around the plunger.

12. In a glass forming apparatus, a finish forming member comprising inner and outer sleeves having substantially co-extensive lower ends, formed with an annular downwardly opening channel, said outer sleeve having a series of radial ports, and means providing communication between the inner ends of said ports and said annular channel.

13. In a glass forming apparatus, a finish forming member comprising inner and outer sleeves having substantially co-extensive lower ends, formed with an annular downwardly opening channel, said outer sleeve having a series of radial ports, means providing communication between the inner ends of said ports and said annular channel, and means providing a separable connection between said sleeves.

14. The method of forming parisons which consists in drawing a measured quantity of glass into the open end of a mold by suction created at radially spaced points at the closed end of said mold, severing the glass and simultaneously closing the open end of said mold, continuing suction after closing of the mold, and substantially simultaneously cutting off the suction and applying air pressure to the glass from the closed end of the mold to give shape to the parison.

15. In glass forming apparatus, the combination of a blank mold, a neck mold and blowing head arranged in register with each other, a plunger movable through the blowing head into the neck mold, a neck and finish shaping member surrounding the plunger, abutting shoulders formed on the plunger and shaping member limiting upward movement of the plunger relative to the shaping member, a plunger cap yieldably engaging the blowing head and said shaping member, means for charging the blank and neck molds, and means for periodically supplying air pressure to said molds.

16. In a glass forming apparatus, a finish forming member comprising a body having an annular downwardly opening channel in its lower end, an annular way in the bottom of said channel, and a series of radial ports providing communication between said way and the outer side of said body.

17. In a glass forming apparatus, a neck mold thimble having an annular radial shoulder on the wall of its bore, a finish shaping member resting upon said shoulder and coacting with the bore wall below the shoulder to form a finish and neck cavity, said member having a series of radial outwardly opening ports, and means providing communication between the inner ends of said ports and the finish cavity.

18. In a glass forming apparatus, the combination of a blank mold, a neck mold and a blowing head in register with the blank mold, a blow slide movable over the blowing head at intervals, a plunger movable into the molds, means for elevating the plunger to a point above the molds and blowing head, and an automatically controlled valve operable after the plunger is moved above said molds and blowing head for causing flow of cooling air through said plunger.

19. In a glass forming apparatus, the combination of a blank mold, a neck mold and a blowing head in register with the blank mold, a plunger movable into the molds, means for elevating the plunger to a point above the molds and blowing head, air supply means, and a cam actuated valve operable while the plunger is above said molds and head for permitting flow of air through the plunger.

20. In a glass forming apparatus, the combination of a rotating mold carriage, blank molds on said carriage, plungers individual to the molds, means for moving the plungers into and out of the molds, air supply means, and cam controlled valves individual to the molds and operable to cause flow of cooling air through the plungers during at least a portion of the time they are out of the molds.

21. In a glass forming apparatus, the combination of a blank mold, a neck mold in register therewith, a blowing head, a blow slide, a plunger movable into said molds, a finish shaping sleeve surrounding said plunger, means for charging said molds, means for moving the plunger upwardly into said sleeve and substantially simultaneously applying air pressure through said sleeve to the charge in the mold to give the parison its final form, and means for elevating the plunger and sleeve above the blowing head and moving the blow slide into register with the blowing head.

Signed at Toledo, in the county of Lucas and State of Ohio, this 30th day of August, 1926.

RICHARD LA FRANCE.